No. 897,765. PATENTED SEPT. 1, 1908.
G. MORIN.
MULTIPLE TELEGRAPHONE SYSTEM.
APPLICATION FILED NOV. 29, 1907.
7 SHEETS—SHEET 1.
Fig. 1,
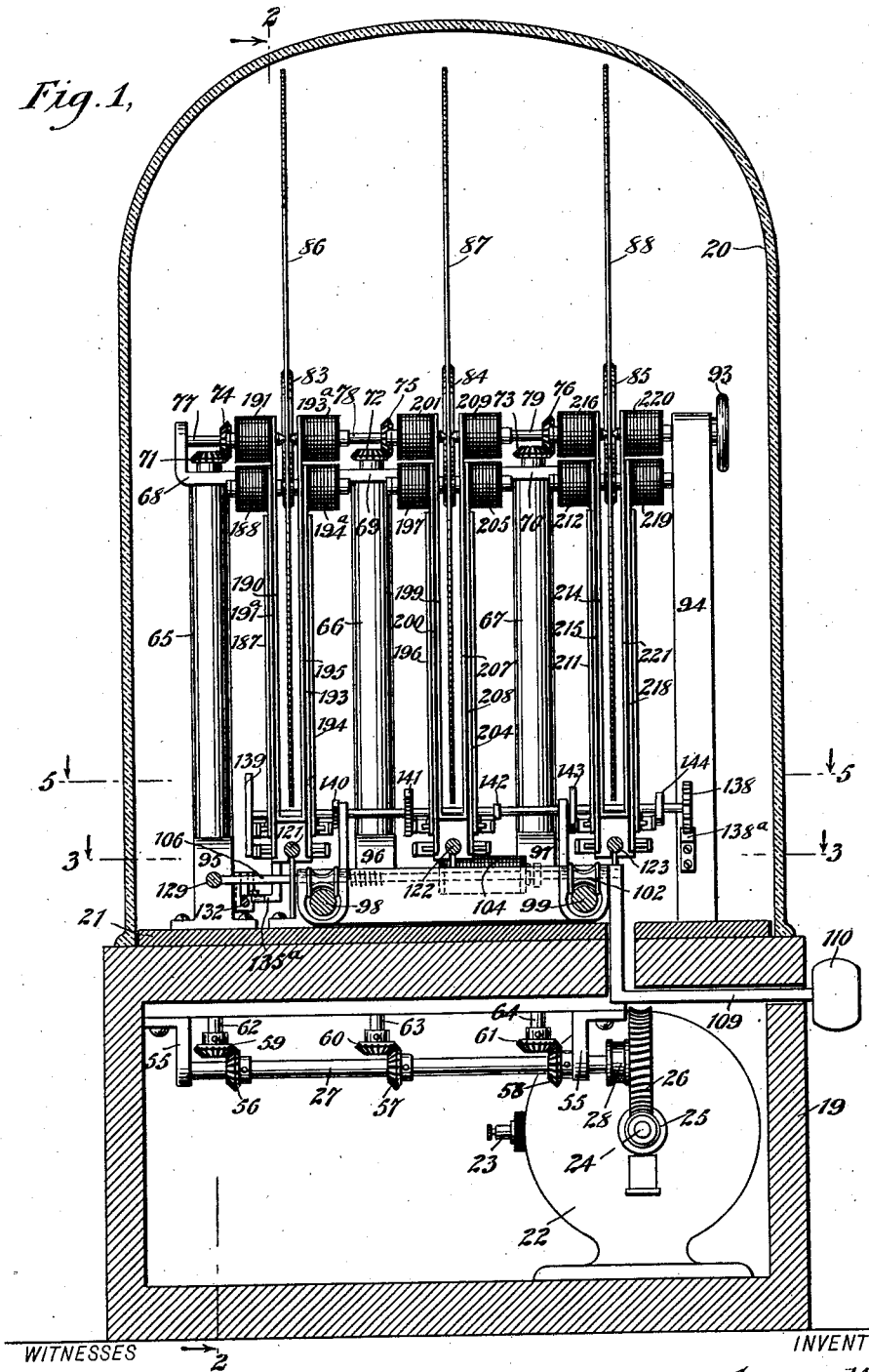
WITNESSES
Edward Thorpe.
Walton Harrison.
INVENTOR
George Morin
BY 
ATTORNEYS No. 897,765.　　　　　　　　　　　　　　　　　PATENTED SEPT. 1, 1908.
G. MORIN.
MULTIPLE TELEGRAPHONE SYSTEM.
APPLICATION FILED NOV. 29, 1907.

7 SHEETS—SHEET 2.

WITNESSES
Edward Thorpe.
Walton Harrison.

INVENTOR
George Morin
BY
ATTORNEYS.

No. 897,765.  
PATENTED SEPT. 1, 1908.  
G. MORIN.  
MULTIPLE TELEGRAPHONE SYSTEM.  
APPLICATION FILED NOV. 29, 1907.

7 SHEETS—SHEET 3.

WITNESSES  
Edward Thorpe  
Walton Harrison

INVENTOR  
George Morin  
BY  
ATTORNEYS

No. 897,765.　　　　　　　　　　　　　　　PATENTED SEPT. 1, 1908.
G. MORIN.
MULTIPLE TELEGRAPHONE SYSTEM.
APPLICATION FILED NOV. 29, 1907.
7 SHEETS—SHEET 4.
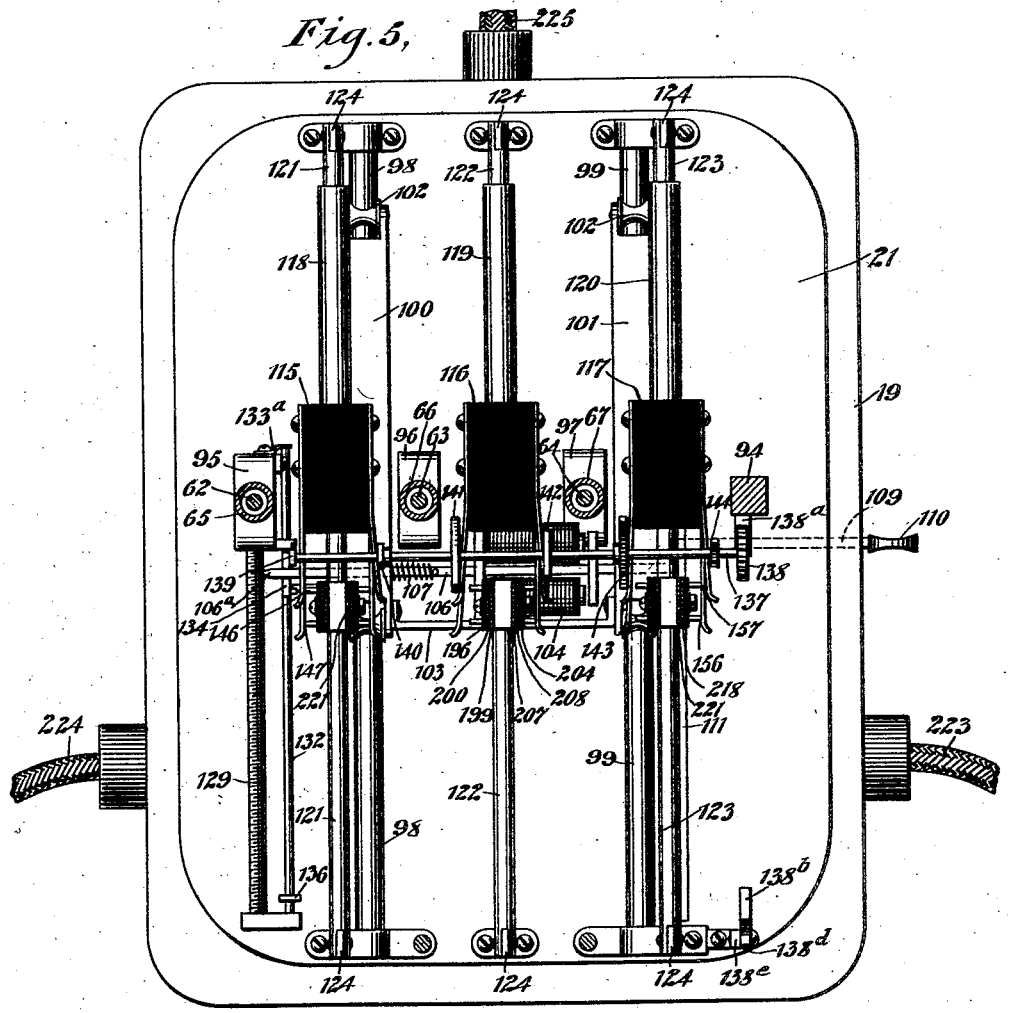
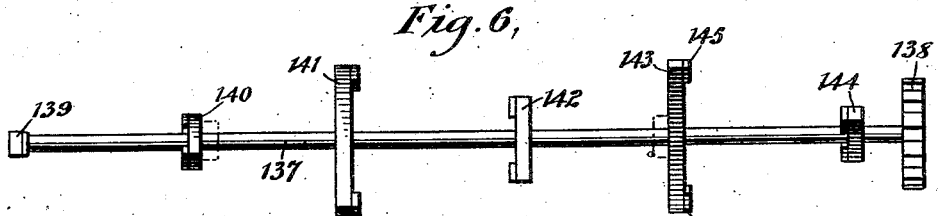
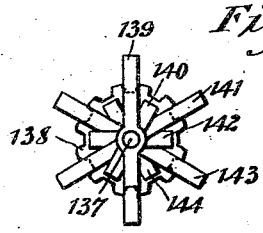
WITNESSES
Edw. Thorpe
Walton Harrison
INVENTOR
George Morin
BY
ATTORNEYS No. 897,765.
PATENTED SEPT. 1, 1908.
G. MORIN.
MULTIPLE TELEGRAPHONE SYSTEM.
APPLICATION FILED NOV. 29, 1907.
7 SHEETS—SHEET 5.
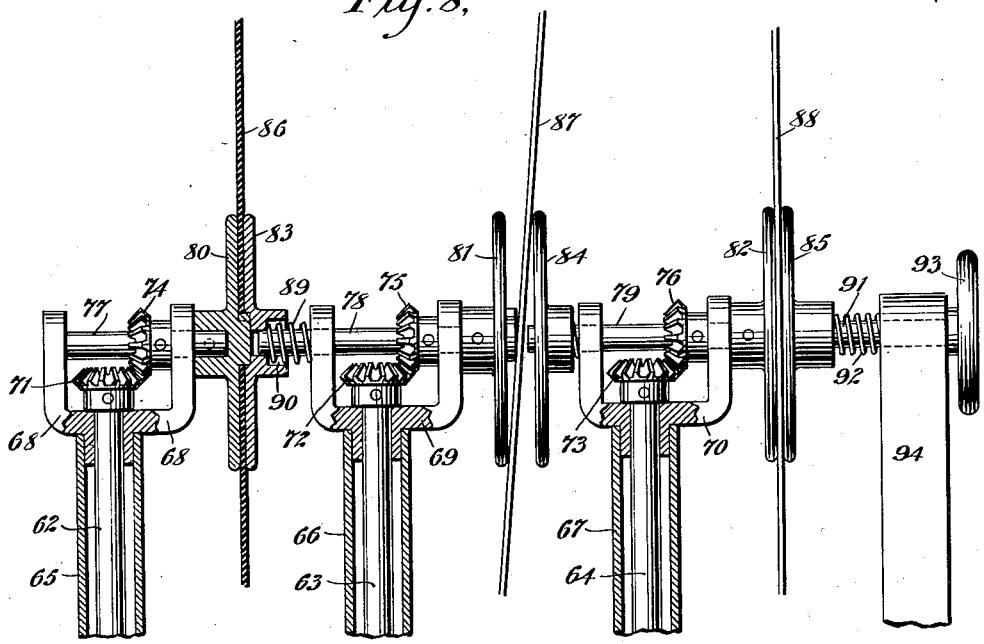
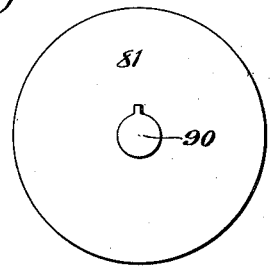
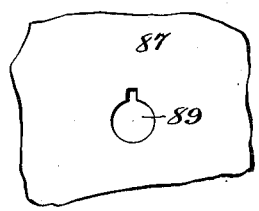
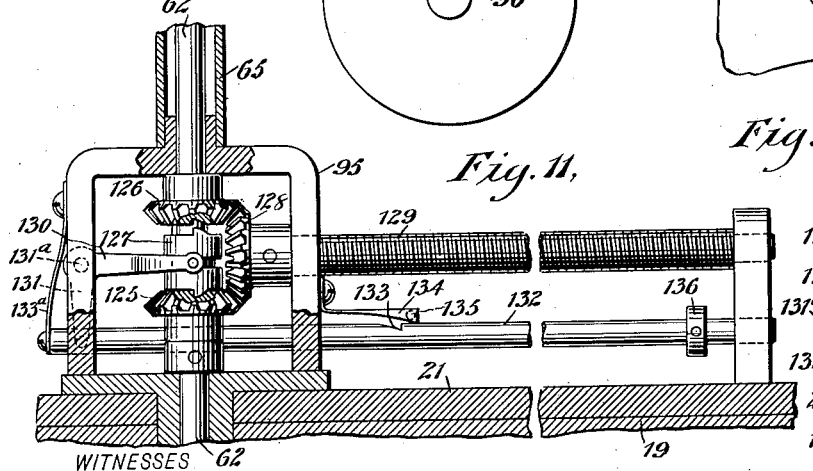
WITNESSES
Edward Thorpe.
Walton Harrison
INVENTOR
George Morin
BY
ATTORNEYS No. 897,765. PATENTED SEPT. 1, 1908.
G. MORIN.
MULTIPLE TELEGRAPHONE SYSTEM.
APPLICATION FILED NOV. 29, 1907.
7 SHEETS—SHEET 6.
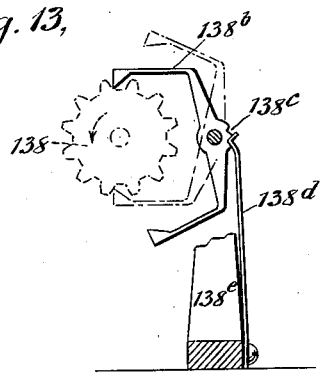
Fig. 13.
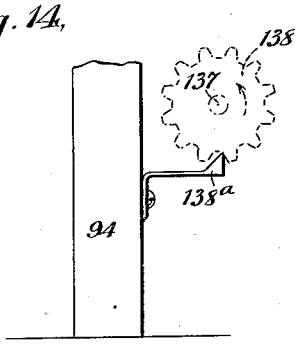
Fig. 14.
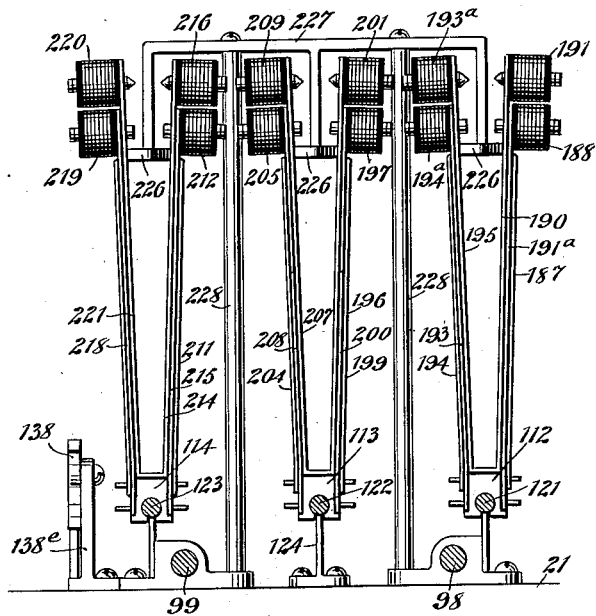
Fig. 15.
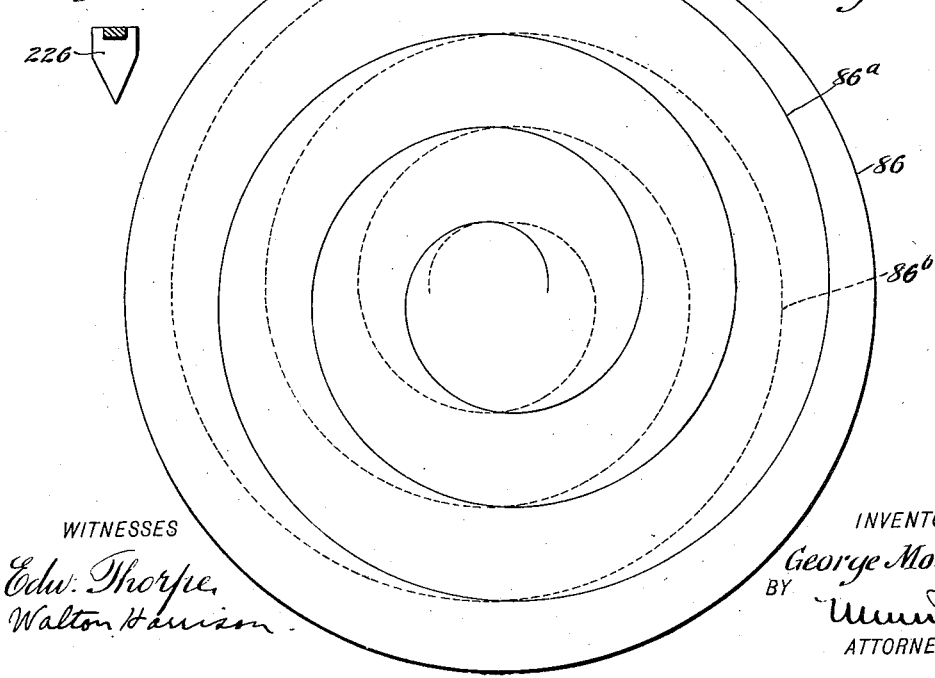
Fig. 16.
Fig. 17.
WITNESSES
Edw. Thorpe
Walton Harrison
INVENTOR
George Morin
BY
ATTORNEYS

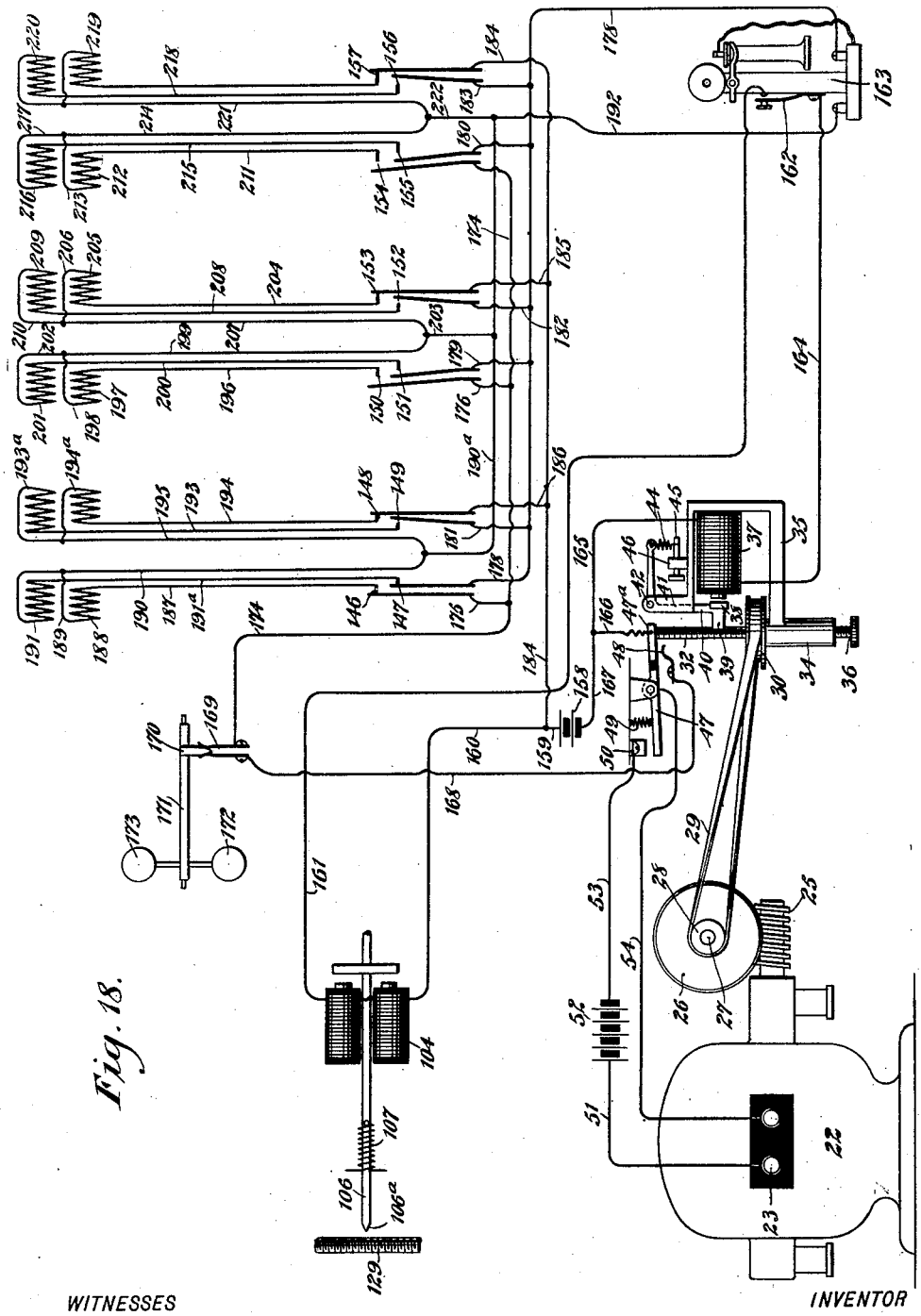

UNITED STATES PATENT OFFICE.

GEORGE MORIN, OF HABANA, CUBA.

MULTIPLE TELEGRAPHONE SYSTEM.

No. 897,765.  Specification of Letters Patent.  Patented Sept. 1, 1908.

Application filed November 29, 1907. Serial No. 404,386.

*To all whom it may concern:*

Be it known that I, GEORGE MORIN, a citizen of the United States, and a resident of Habana, Cuba, have invented a new and Improved Multiple Telegraphone System, of which the following is a full, clear, and exact description.

My invention relates to telegraphone systems, my more particular object being to provide a number of separate telegraphone disks so arranged that they may be brought successively into action either automatically or by hand, as desired.

My invention further relates to means whereby the various disks may be readily taken out of the machine and replaced by other disks.

My invention relates still further to various improvements in construction whereby the action of the telegraphone is improved.

Reference is to be had to the accompanying drawings forming a part of this specification, in which similar characters of reference indicate corresponding parts in all the figures.

Figure 2:
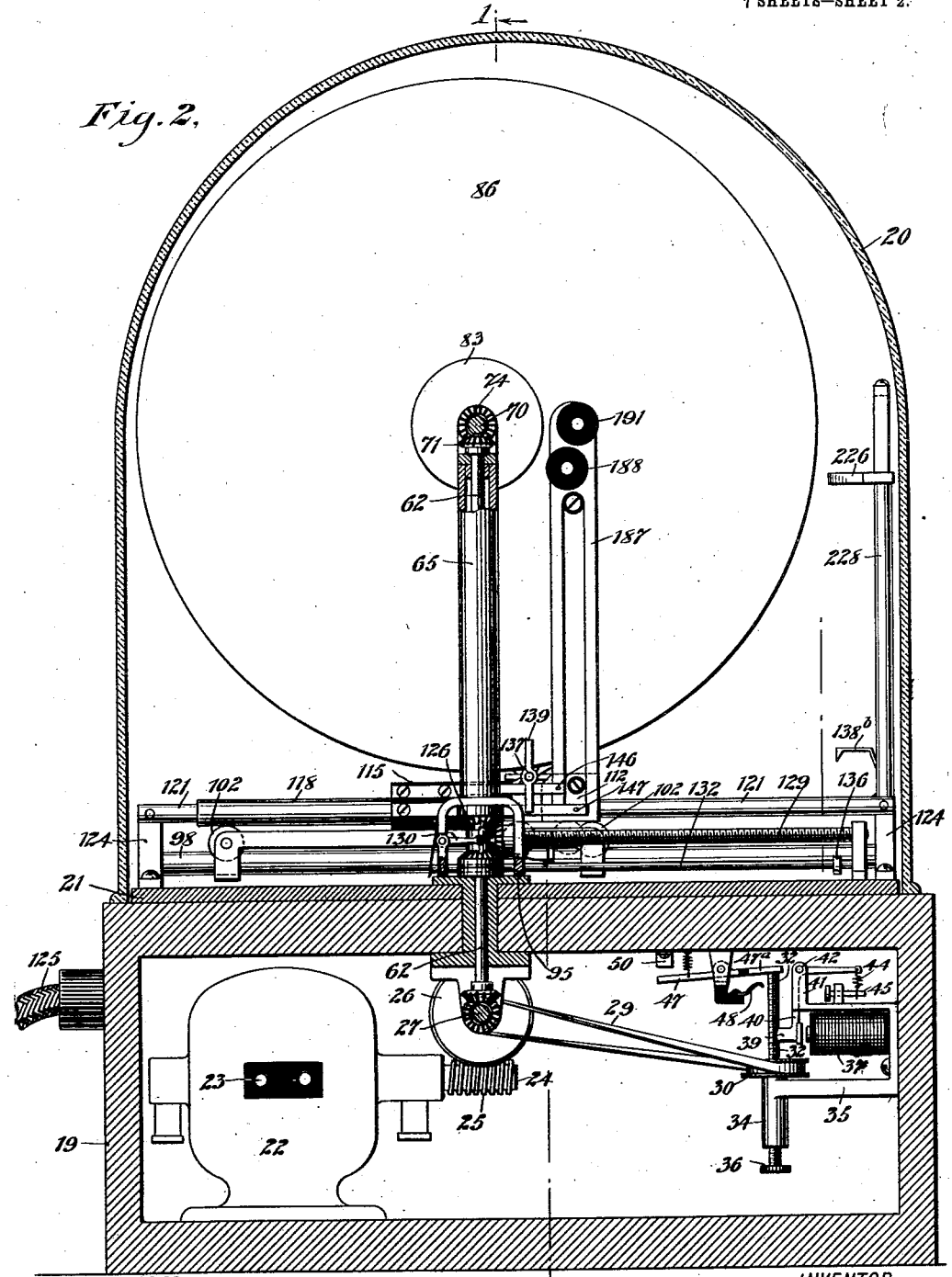
Figure 3:
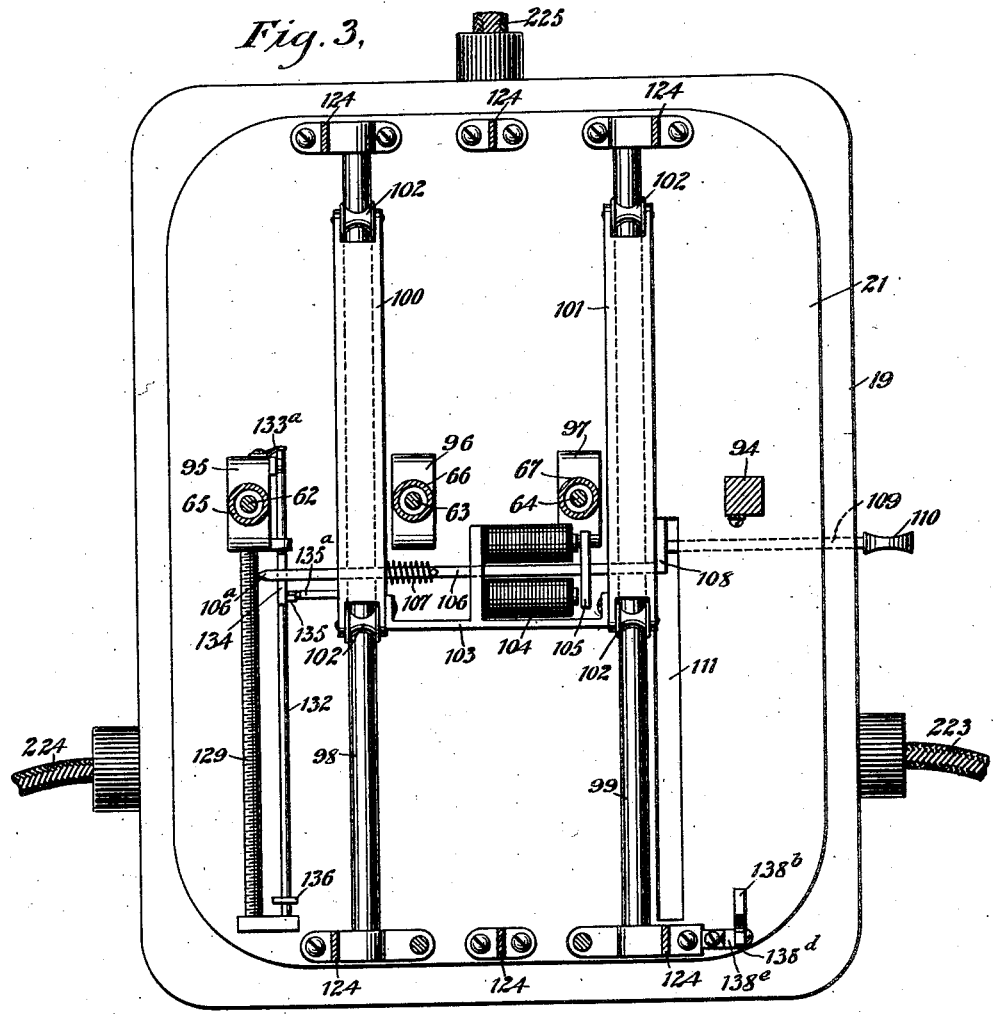
Figure 4:
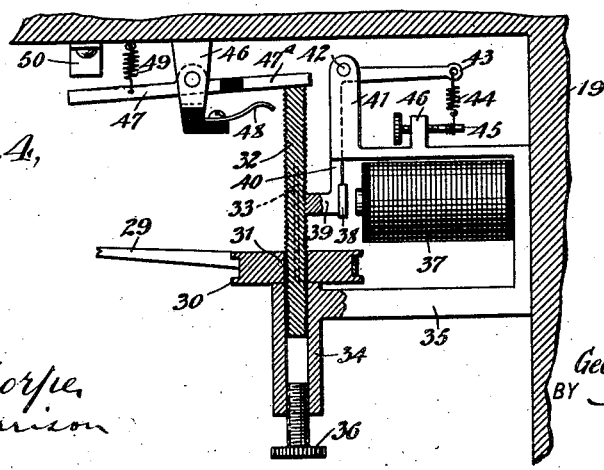

Figure 1 is a central vertical section through a machine provided with my improved telegraphone system, this view being taken upon the line 1—1 of Fig. 2, looking in the direction of the arrows, and showing the movable carriage provided with the magnets used for recording and reproducing, and also the magnets used for erasing the magnetic impressions, this view further showing various mechanical details including the motive power for propelling the disks and the means for throwing the magnets into and out of circuit; Fig. 2 is a section upon the line 2—2 of Fig. 1, looking in the direction of the arrows, and showing the feed screw for moving the carriage, the clutch mechanism for reversing the direction of travel of the feed screw at intervals, and further showing the motor mechanism for driving the machine, and also the magnetically-operated mechanism for starting the motor into action; Fig. 3 is a horizontal section upon the line 3—3 of Fig. 1, looking in the direction of the arrows, and showing the magnet for controlling the travel of the carriage, as affected by the feed screw, the magnet in question, for this reason, being designated as the feed magnets; Fig. 4 is an enlarged section through the electrically-operated mechanism for starting the machine into action; Fig. 5 is a horizontal section upon the line 5—5 of Fig. 1, looking in the direction of the arrows, and showing particularly the contact mechanism for throwing the various recording and erasing magnets into and out of circuit at proper intervals, this view further showing the mechanism, operated automatically by movements of the carriage, for opening and closing said contact mechanism; Fig. 6 is a plan view of the controller shaft which is revoluble step by step and is provided with fingers for opening and closing the various electrical contacts, thereby manipulating in proper successive order, the various circuits through the erasing and recording magnets; Fig. 7 is an end elevation of the controller shaft, showing the same as viewed from the left of Fig. 6, the shaft in Fig. 7, however, being turned 90° as compared with its position in Fig. 6; Fig. 8 is a fragmentary front elevation, partly broken away and showing how the various record disks are mounted in position and driven by appropriate gearing; Fig. 9 is an elevation of one of the clutch members used for holding the record disks, this view further showing how the disks are prevented from turning relatively to their support; Fig. 10 is a fragmentary elevation of another one of the clutch members used for supporting the record disks; Fig. 11 is an enlarged fragmentary section showing the feed screw, and the reversing clutch for changing the direction of rotation of the feed screw for the purpose of causing the erasing and recording magnets to travel backward and forward relatively to the centers of the various disks; Fig. 12 is a fragmentary elevation showing the mountings for the feed screw and parts connected therewith as viewed from the left of Fig. 11; Fig. 13 is a fragmentary section showing the step by step gear wheel mounted upon the controller shaft and turned by the rocking of a double pawl, for the purpose of turning the controller shaft step by step, and thereby causing the opening and closing of the electrical contacts to take place in proper successive order; Fig. 14 is a fragmentary elevation showing additional means whereby the controller shaft is turned step by step, the idea being that when the movable carriage reaches one end of its stroke, the controller shaft is turned by the mechanism shown in Fig. 13, whereas when the carriage reaches the opposite end of its stroke, the controller shaft is turned by the device shown in Fig. 14; Fig. 15 is a rear elevation of the various magnets used for recording and reproducing, and also of the magnets used for erasing, this view showing further how the magnets are supported and how at certain stages they are moved into predetermined positions for the purpose of separating them from the record disks, thus facilitating the removal of the disks. Fig. 16 is a fragmentary section showing one of the switches used for moving apart the magnets of a pair when the carriage reaches a predetermined position in its travel; Fig. 17 is a diagrammatic view of one of the record disks, showing in full lines the record track upon one face of the disk, and in dotted lines the record track upon the opposite face thereof, this view indicating how any stray magnetic lines passing through the disk from one side to the other can do but little harm; Fig. 18 is a diagram of the wiring of the system, this view showing particularly the motor circuit, the various circuits used for recording or reproducing, and also the circuits used for erasing.

A casing 19 contains portions of the mechanism and other portions are mounted upon the top of this casing and protected from the dust by a glass covering 20. A base plate 21 is secured directly upon the casing and serves as a mounting for other parts. An electric motor 22 is disposed within the casing and is provided in the usual manner with terminals 23. The armature shaft of this motor is shown at 24 and is provided with a worm 25. A worm wheel 26 is mounted upon a revoluble shaft 27 and engages the worm 25. Mounted upon the shaft 27 is a pulley 28 connected by a belt 29 with a pulley 30, the latter being provided centrally with a smooth hole 31 extending entirely through it. A screw 32 extends through the hole 31 and serves as an axle upon which the pulley 30 is free to turn. By means of a spline 33 the screw 32 is connected with the pulley 30 in such manner that the rotation of the pulley 30 causes the screw to turn, but offers no restriction to the vertical or endwise movement of the screw through the pulley 30. A sleeve 34, having the form of a cylinder, is mounted rigidly upon a bracket 35 and is provided at its bottom with an adjustable screw 36. By turning this screw the altitude to which the screw 32 can descend may be regulated within proper limits at will.

A magnet is shown at 37. Because of the peculiar office of this magnet I designate it as a starting magnet. It has a movable armature 38 mounted upon an armature lever 40 and provided with a portion 39 provided with a thread mating the thread of the screw 32. The portion 39 serves practically as a nut in its relation to the screw 32, but is released from the screw whenever the armature 38 is attracted by the magnet 37, as will be understood from Fig. 4. A bracket 41 supports the armature lever 40 which, for this purpose, is provided with a pivot pin 42. One end of the armature lever 40 terminates in an eye 43 and connected with this eye is a spring 44 leading downwardly to an adjusting winch 45. By turning this winch the tension of the spring 44 may be regulated and consequently the pressure of the threaded portions 39 of the armature lever against the screw 32 may be controlled. A bracket 46 supports a rocking lever 47. This lever is provided with a contact portion 47ª insulated from other parts of the lever and adapted to engage the top of the screw 32 and also to engage a spring 48 whenever the screw 32 drops downwardly. The contact spring 48 is mounted upon the lower end of the bracket 46 and is insulated from other metallic parts. A retracting spring 49 is connected with the lever 47 and tends to restore it into a predetermined position whenever the screw 32 is in its lowermost position.

A contact member 50 is mounted upon the casing 19 and is adapted to be engaged by the lever 47. The action of the parts shown in Fig. 4 is such that whenever the magnet 37 is energized, the screw 32 is released and drops downwardly, electrical contact being thereby closed between the contact members 47ª and 48, and also between the lever 47 and contact member 50. The rotation of the screw 32 continues as long as the belt 29 is in motion. The electrical connection for the motor 22 and various other parts of the mechanism may best be understood by reference to Fig. 18.

A wire 51 leads from one of the terminals 23 to a battery 52 or other source of electric energy. From here a wire 53 leads to the contact member 50. The lever 47 communicates, by a wire 54, with the remaining terminal 23 of the motor. The shaft 27 (see Fig. 1) is supported upon brackets 55 and carried by this shaft are bevel gears 56, 57, 58, these gears being rigid in relation to the shaft. Meshing with the three bevel gears just mentioned are three other bevel gears 59, 60, 61 mounted rigidly upon vertically disposed revoluble shafts 62, 63, 64. These three shafts extend through tubes 65, 66, 67 which are secured at their upper ends by hooks 68, 69, 70 (see Fig. 8). Mounted upon the upper ends of the vertical shafts 62, 63, 64 are bevel gears 71, 72, 73. These mesh with bevel gears 74, 75, 76. For the purpose of supporting the three bevel gears last-mentioned I provide three stub shafts 77, 78, 79 which are supported by the hooks 68, 69, 70. Clutch members 80, 81, 82 are connected each with one of the stub shafts 77, 78, 79. Clutch members 83, 84, 85, mating the clutch members 80, 81, 82, are disposed oppositely thereto so that the clutch members are arranged in pairs, as indicated in Fig. 8.

The record disks are shown at 86, 87, 88 and are mounted separately, as indicated in Fig. 8. For instance, in order to place the disk 87 in position, the clutch member 84 is forced to the right, the disk inserted and the clutch member 84 then allowed to close tightly against the record. While, therefore, any record disk or disks can be removed at will and replaced by others, the rotation of the disks when mounted is practically the same as if they were rigid upon a single shaft common to them all. One of the disks is shown in Fig. 17. At 86$^a$ is a record track upon one face of the disk and at 86$^b$ is a record track upon the opposite face thereof. It sometimes happens, especially in making the record disk comparatively thin, that the magnetic lines impressed upon one side of the disk, find their way through the middle and affect the opposite side. In my system, however, as indicated in Fig. 17, any stray lines of magnetic force finding their way through the disk, can have but a minimum of effect toward producing any disturbing action in the currents used for reproducing the sounds.

Each clutch member 83, 84 is pressed upon by a spiral spring 89 which enters a socket 90 for this purpose. A stub shaft 91 is encircled by a spiral spring 92 which presses against the record member 85, as indicated at the right of Fig. 4. A hand wheel 93 is used for the purpose of turning the stub shaft 91, and through the medium of the various connecting parts, of rotating any or all of the record disks 86, 87, 88 by hand in order to adjust them properly in position. A standard 94 supports the hand wheel 93 and stub shaft 91.

Hooks 95, 96, 97 serve as bearings for the lower ends of the revoluble shafts 62, 63, 64, as will be understood from Fig. 3. Extending horizontally across the bed plate 21 (see Fig. 3) are two tubular tracks 98, 99 movable relatively to which are frame members 100, 101, supported upon the tracks by aid of rollers 102. A bracket 103 connects together the frame members 100, 101. Mounted upon the bracket 103 is a feed magnet 104. It is provided with a movable armature 105 which is connected to a rod 106. A retracting spring 107 normally maintains the rod 106 in such position that the armature 105 is out of contact with the magnet 104 but is adapted to be attracted thereby. The rod 106 is provided with a threaded point 106$^a$. One end of the rod 106 is connected with a plate 108 and mounted upon the latter is a pin 109 provided with a thumb piece 110. A slot 111 is cut through the bed plate 21 and the top of the casing 20 in order to allow the plate 108 to move horizontally, as will be understood from Fig. 3.

Slides 112, 113, 114 (see Fig. 1) are connected with blocks 115, 116, 117 of insulating material, and disposed below the latter are tubes 118, 119, 120 slidably mounted upon rods 121, 122, 123, as will be understood from Figs. 1 and 5. The rods 121, 122, 123 are supported by short standards 124. The tubes 118, 119, 120, together with the slides 100, 101, bracket 103 and other parts connected rigidly therewith, together constitute a carriage which as a whole is movable back and forth upon the horizontal rods 121, 122, 123.

Referring to Fig. 11 it will be noted that the vertical shaft 62 is provided with bevel gears 125, 126 mounted loosely thereupon. A clutch 127 is movable relatively to these gears and is adapted to engage the same alternately. This clutch member is splined upon the shaft 62 and consequently is revoluble therewith. A bevel gear 128 meshes with the bevel gears 125, 126 and is mounted rigidly upon a threaded shaft 129. A clutch fork 130 engages the revoluble clutch member 127. This fork is provided with a downwardly projecting portion 131 carrying a pin 131$^a$ (see Fig. 12) and supported upon this pin is a sliding shaft 132 having a limited movement. This shaft is provided with a notch 133 with which a pawl 134 is adapted to engage. This pawl is provided with a pin 135 projecting horizontally and so arranged that when the pin is lifted the pawl 134 is raised out of the notch 133. Mounted upon the shaft 132 is a set collar 136 whereby the shaft is moved to the right according to Fig. 11, and when this occurs the pawl 134 clicks into the notch and prevents the immediate return of the shaft. When, however, the pin 135 is lifted, the shaft 132 moves to the left according to Fig. 11; this movement is accomplished by aid of a leaf spring 133$^a$ which is secured to the end of the shaft.

Referring, now, to Fig. 3, it will be noted that the carriage carries a trigger 135$^a$ which, when the carriage reaches one end of its stroke, runs under the pin 135 and raises the pawl 134 out of the notch 133. When, however, the carriage reaches the opposite end of its stroke, it engages the collar 136 and moves the shaft 132 in the opposite direction. This alternate movement of the shaft 132 causes the clutch fork 130 to rock and thus cause the clutch member 127 to alternately engage the bevel gears 125, 126. Hence, the rotary motion of the feed screw 129 is first in one direction and then in the other, the reversal taking place at the respective limits of the carriage movement back and forth.

The controller shaft 137 may be seen in Fig. 6. It is provided with a gear 138 and is also provided with a number of fingers 139, 140, 141, 142, 143, 144. Each finger is provided at its opposite ends with pressure plates 145. The several fingers are disposed at different angles relatively to each other and are rigid upon the shaft (see Fig. 7).

A spring pawl 138$^a$ is mounted upon the standard 94 (see Figs. 1 and 5) and engages the gear 138 so as to turn the same step by step as the carriage moves back and forth (see Fig. 14). This is when the carriage is at one end of its stroke. When, however, the carriage is at the opposite end of its stroke, the wheel 138 is turned by the double pawl 138$^b$, as indicated in Fig. 13. This pawl is provided with notches 138$^c$, into which fits a leaf spring 138$^d$, the pawl being supported upon a bracket 138$^e$. The double pawl 138$^b$ rocks up and down, as indicated by full and dotted lines in Fig. 13, the rotation of the gear 138, and consequently of the controller shaft 137, being thus made positive. Moreover, the controller shaft is locked for a moment when the carriage is thus at the end of its stroke, as will be understood from Fig. 13.

Disposed partially within the paths of the several fingers 139 to 144 inclusive, are electrical contacts 146, 147, 148, 149, 150, 151, 152, 153, 154, 155, 156 and 157. These contacts are so arranged that the step-by-step rotation of the controller shaft opens and closes them in a predetermined order, for the purpose of controlling the currents to the various magnets. This can best be explained by reference to the diagram shown in Fig. 18. A battery 158 is connected with a wire 159 and this wire is connected with another wire 160 which leads to the feed magnets 104. From the latter a wire 161 leads to a push button 162 mounted upon a telephone 163. From the push button a wire 164 leads to the starting magnet 37 and from the latter a wire 165 connects with a wire 166 leading downwardly to the insulated contact member 47$^a$. Connected with the wires 165, 166 is a wire 167 leading to the battery 158.

Connected with the contact spring 48 is a wire 168 which leads upwardly to a contact 169. This contact is opened and closed by a wedge 170 of conducting material. The wedge is supported upon a rocker shaft 171 and is actuated in either of two directions by the buttons 172, 173. By depressing the button 173 by hand, the wedge 170 is lifted so as to open the contact 169. By depressing the button 172, however, the wedge 170 closes the contact 169. From the contact 169 a wire 174 leads downwardly, and branching off from it are wires 175, 176. The wires 174, 175, 176 are in electrical communication with the contacts 154, 146, 150. A wire 178 is connected with the telephone 163 and is also connected with a wire 179 leading to the contact 151 and a wire 180 leading to the contact 155. A wire 181 leads from the wire 178 to the contact 149. Wires 182, 183 lead up to contacts 152, 156.

Connected with the wire 159 from the battery 158 is a wire 184. Leading upwardly from this wire are two other wires 185, 186 communicating respectively with the contacts 153 and 148. The contact 146 (see top of Fig. 18) is connected by a metallic spring 187 with a magnet 188. This magnet, like others of its kind, I designate as an erasing magnet. Its purpose is to so magnetize the record disk as to remove therefrom any magnetic lines remaining upon it from previous use. I find it a good plan to use the erasing magnets very often, for the reason that even if the disk be relatively free from magnetic impressions, or in other words, if it be "magnetically clean", the action of an erasing magnet tends to render it unusually susceptible for purposes of receiving magnetic impressions.

From the erasing magnet 188 a wire 189 leads to a conductor 190 having the form of a spring. The metallic spring 190 is connected with a wire 190$^a$, the latter being joined by a wire 192 which leads downwardly to the telephone 163. At 191 is shown one of the recording magnets. This magnet, like others of its kind, is used for the purpose of producing magnetically upon the steel recording disk, the magnetic impressions analogous to sound waves. The recording magnet 191 is supported upon a spring 191$^a$ of metal or other conducting material, the latter being connected with the contact 147.

The magnets used for recording and reproducing are provided with pointed poles for the purpose of concentrating the lines of force upon the record disks. The reproducing magnets, however, are provided with flat poles, in order that each may affect a considerable number of lines of force and thereby render the erasure more nearly perfect. A metallic spring 193 is connected at its bottom with the contact 149. This spring supports at its upper end a recording and reproducing magnet 193$^a$. Similarly a spring 194 supports an erasing magnet 194$^a$. The magnet 193$^a$ is connected by a spring 195 with the spring 190 and also with the wire 190$^a$. In a manner similar to that above set forth a spring 196, of conducting material, supports an erasing magnet 197, the latter being connected to a wire 198. Springs 199, 200 support a magnet 201 used for recording and for reproducing, this magnet being connected by a wire 202 with the spring 199. This spring is connected by a wire 203 with the wire 190$^a$. A spring 204 supports an erasing magnet 205, the latter being connected by a wire 206 with a spring 207. A spring 208 supports a recording and reproducing magnet 209, the latter being connected by a wire 210 with the spring 207. A spring 211 is connected with an erasing magnet 212 and from the latter a wire 213 leads to a spring 214. At the upper end of a spring 215 is a recording and reproducing magnet 216, being connected by a wire 217 with the spring 214. All of the magnet supporting springs are insulated. The same system is continued with reference to springs 218, erasing magnet 219, recording and reproducing magnet 220 and spring 221.

This spring is connected by a wire 222 with the wire 190ª. The contacts 146 to 157 inclusive, are adapted to make and break electric communication with the several magnets used for recording and reproducing, and for erasing, as will be understood from Fig. 18.

For convenience the various wires are connected together and formed into cables 223, 224, 225, as indicated in Fig. 5. A number of stationary wedges 226 (see Figs. 15, 16) are supported upon a bracket 227, the latter being mounted upon standards 228. The arrangement of these wedges is such that they pry apart the vertically disposed springs supporting the magnets and used for erasing and for recording or reproducing. This action takes place when the carriage reaches one end of its stroke, as will be understood from Fig. 15. The particular purpose of thus prying the springs apart is to facilitate the removal of the disks.

The operation of my system is as follows: The operator first arranges the several record disks as indicated in Fig. 8, and in the manner above described. If he wishes to erase the record surfaces existing upon the record disks owing to previous use thereof, he causes the erasing magnets to be energized, and throws the machine into action. If he wishes to listen to sounds reproduced by the telegraphone, he energizes only the magnets used for recording or reproducing. If he wishes to record anything for subsequent reproduction, he can energize both the erasing magnets and the magnets used for recording. This is because the erasing magnets act upon parts of the disk ahead of the recording magnets, and in such manner as to quicken the susceptibility of the recording disks. In doing this the erasing magnets "clean" the disks, as above described.

The movement of the carriage may be controlled at will. This is accomplished by manipulating the thumb piece 110 (see Fig. 1). For instance, by moving the thumb piece in question, the carriage may be placed in any desired position within its limits of stroke, and then the recording and reproducing magnets will properly perform their work as the motor runs. Suppose, now, that the machine is ready to start and that the carriage is at the outer end of its stroke, representing, as nearly as practicable, the outer edge of the disk. The operator now presses the button 162 (see lower right-hand corner of Fig. 18). This causes the following circuit: battery 158, wire 167, wire 165, starting magnet 37, wire 164, push button 162, wire 161, feed magnet 104, wire 160 and wire 159 back to battery 158. The feed magnet being energized attracts its armature, thus forcing the rod 106 to the left, according to Fig. 18, so that the threaded point 106ª now engages the feed screw 129. The starting magnet 37 being also energized, attracts its armature 38 and releases the screw 32 which drops downwardly its full limit. This allows the lever 47 to move and the contact member 47ª is brought into engagement with the contact spring 48. This completes the following circuit: battery 158, wire 167, wire 166, contact member 47ª, contact spring 48, wire 168, contact 169, wire 174, wire 175, contact 146, spring 187, erasing magnet 188, wire 189, spring 190, spring 195, erasing magnet 194ª, spring 194, contact 148, wire 186, wire 184, wire 159, back to battery 158. This energizes the erasing magnets 188, 194ª, provided, of course, that the button 172 is depressed so as to close the contact 169.

A reproducing or recording circuit, as the case may be, may now be traced as follows: telephone 163, wire 178, contact 147, spring 191ª, recording or reproducing magnet 191, spring 190, wire 190ª, wire 192, back to telephone 163. It will be noted that this circuit is the same whether the machine be used for recording or reproducing.

The movement of the lever 47, above described, also closes the motor circuit as follows: battery 52 (or equivalent source of electric energy), wire 53, contact 50, lever 47 (now engaging the contact), wire 54, motor 22, wire 51, back to battery 52. This circuit starts the motor and causes the rotation of the worm 25 and worm gear 26, motion being thus transmitted by the belt 29 to the pulley 30 and starting screw 32. This screw being dropped to the bottom by the action of the magnet 37, begins its ascent and upon reaching its upper limit, it raises the lever 47, thereby breaking the motor circuit and also the circuit through contact members 47ª, 48, thus rendering the machine idle and limiting the time of its use upon this occasion.

The rod 106, as above described, is, at the beginning of the operation, at the outer end of the feed screw 129 represented, for instance, by the lower left-hand corner of Fig. 3. The movement of the rod 106 is, therefore, toward rather than away from the center of the machine. The carriage reaching its innermost limit, however, the direction of the feed screw 129 is reversed by aid of the clutch mechanism shown at the left of Fig. 11, as above described, and forthwith the rod 106 begins to travel in the opposite direction. At the instant when the reversal in the direction of the feed screw 129 takes place, the controller shaft turns one step as above described. This takes place at the precise instant when the record has moved into such position that the recording magnet is nearest the center of the record disk. A slight rotation in the controller shaft now causes the contact finger 139 to open the contacts 146 and 147 and to close the contact 149. This shifts the circuit from the recording or reproducing magnet 191 to the recording or reproducing magnet 193ª, and therefore transfers the magnetic action of the disk to the opposite side thereof. A new face of the disk being thus brought into use, the action continues as before, with the exception that the recording or reproducing magnet now being used is traveling from the center toward the edge of the disk, there being for the time no erasing magnet in circuit. Upon completing this stroke, the next successive contact finger shifts the circuit through the next contact 151 and opens the contact 146, closing the contact 150. The net result is that the circuit through the first pair of erasing magnets is broken, the circuit through the next pair of erasing magnets is closed, and the recording or reproducing, as the case may be, is done by the recording or reproducing magnet 197. Each time the carriage finishes its stroke its direction of travel is reversed, and the current is shifted, finally leaving the apparatus in the condition in which it originally started.

The operator, by depressing the button 173 (upper left-hand corner of Fig. 18) may cut out the erasing circuit as soon as the last disk is finished, if he wishes to listen to the record made. For instance, if he has dictated something into the telephone and wishes to hear it reproduced for correction, he can do so by pressing the button 173 so as to open the erasing circuit, making no other change. The action of the machine being now repeated, he will hear the reproduction. If at any time, for instance while he is listening to the reproduction of his own dictation, he presses the button 172, he can throw the erasing magnet again into circuit, and by so doing he can cut out or obliterate any part of the record. He can correct the record after such obliteration by manipulating the apparatus partially by hand, as above described, and repeating into the telephone the words constituting the correction. These words are recorded upon that part of the disk corresponding to where the erasure took place. If the button 173 be pressed so as to leave contact 169 open, the apparatus can only reproduce. If, therefore, reproduction be all that is necessary, the operator must be careful not to depress the button 172. Suppose, now, that through use the records have become exhausted, or for any reason it be desired to erase the magnetic impressions from the disk. This I do by starting up the apparatus, as above described, and depressing the push button 173 until each part of every disk has been thoroughly exposed to the action of the erasing magnet.

Having thus described my invention, I claim as new and desire to secure by Letters Patent:

1. The combination of a plurality of revoluble members, each adapted to hold magnetic impressions analogous to sound waves, means for actuating said revoluble members, magnetic members associated with said revoluble members for the purpose of recording magnetic impressions thereupon, and means for throwing one of said magnetic members into action and another out of action, for the purpose of making a record continuous.

2. The combination of a revoluble member provided with oppositely disposed portions, each adapted to receive magnetic impressions analogous to sound waves, a magnet disposed adjacent to said revoluble member and movable bodily in relation to the general position thereof, for the purpose of receiving magnetic impressions therefrom, said magnetic member being disposed adjacent to one of said oppositely disposed portions, a second magnetic member disposed adjacent to the other of said oppositely disposed portions, and means for shifting a circuit from one of said magnetic members to the other.

3. The combination of a plurality of record members provided with magnetic surfaces, magnetic members disposed adjacent to said magnetic surfaces, circuits for controlling said magnetic members, and means for opening one of said circuits and closing another for the purpose of shifting the magnetic action from one of said record members to another.

4. The combination of a plurality of telegraphone disks, magnets associated with said disks for the purpose of affecting magnetic impressions to be carried thereupon, contacts connected with said magnetic members for the purpose of opening and closing circuits therethrough, a carriage for supporting said magnetic members, and means controllable by movements of said carriage for opening and closing said contacts in a predetermined order of succession.

5. The combination of a plurality of record members, magnetic members movable relatively thereto, a feed screw for advancing said magnetic members relatively to said record members, mechanism engaging said feed screw for the purpose of controlling the general position of said magnetic members relatively to said record members, a movable carriage for supporting said magnetic members, and means controllable by movements of said carriage for disengaging said feed screw.

6. The combination of a plurality of telegraphone record members, a plurality of magnetic members movable relatively to said record members, a feeding mechanism common to all of said magnetic members for the purpose of advancing them relatively to said disks, and means for successively shifting a circuit from one of said magnetic members to another, as the operation of the respective record members is finished.

7. The combination of a plurality of record members, a magnetic member for erasing magnetic impressions from said record members, another magnetic member for recording magnetic impressions upon said disks, and electric mechanism controllable automatically by the machine for energizing said magnetic members in a predetermined relative order.

In testimony whereof I have signed my name to this specification in the presence of two subscribing witnesses.

GEORGE MORIN.

Witnesses:
VICTOR NORMAND,
O. A. HORNSBY.